United States Patent
Hellerhoff et al.

(10) Patent No.: US 12,549,260 B2
(45) Date of Patent: Feb. 10, 2026

(54) METHOD FOR POLARIZATION COMPENSATION AND FREE-SPACE OPTICAL COMMUNICATION SYSTEM FOR AIRCRAFT

(71) Applicant: AIRBUS S.A.S., Blagnac (FR)

(72) Inventors: Nils Hellerhoff, Taufkirchen (DE); Alberto Comin, Taufkirchen (DE)

(73) Assignee: AIRBUS S.A.S., Blagnac (FR)

( * ) Notice: Subject to any disclaimer, the term of this patent is extended or adjusted under 35 U.S.C. 154(b) by 248 days.

(21) Appl. No.: 18/452,847

(22) Filed: Aug. 21, 2023

(65) Prior Publication Data
US 2024/0063918 A1  Feb. 22, 2024

(30) Foreign Application Priority Data
Aug. 22, 2022  (EP) .................................... 22191368

(51) Int. Cl.
*H04B 10/61* (2013.01)
*H04B 10/70* (2013.01)

(52) U.S. Cl.
CPC ......... *H04B 10/6162* (2013.01); *H04B 10/70* (2013.01)

(58) Field of Classification Search
CPC ........................... H04B 10/70; H04B 10/6162
USPC ...................................................... 398/208
See application file for complete search history.

(56) References Cited

U.S. PATENT DOCUMENTS

| 12,202,617 B2* | 1/2025 | Hiller ..................... B64D 33/04 |
| 2004/0001255 A1* | 1/2004 | Fratello ................ G02B 5/3025 |
| | | 359/484.05 |
| 2006/0290941 A1* | 12/2006 | Kesler ................... H04L 9/0858 |
| | | 356/491 |

(Continued)

FOREIGN PATENT DOCUMENTS

| CN | 113037392 | 6/2021 |
| WO | 2010142964 | 12/2010 |

(Continued)

OTHER PUBLICATIONS

Kraemer et al; Achromatic retarders in polarization optics; Aug. 2019, Optical Engineering SPIE digital library; pp. 1-16. (Year: 2019).*

(Continued)

*Primary Examiner* — Amritbir K Sandhu
(74) *Attorney, Agent, or Firm* — Nixon & Vanderhye P.C.

(57) ABSTRACT

A method for polarization compensation includes: (a) generating at least one beam of an electromagnetic wave; (b) sending the at least one beam through a physical medium; (c) receiving the at least one beam of an electromagnetic wave after it has traversed the physical medium; (d) measuring the intensity of the electromagnetic wave after it traverses a system of electromagnetic retarders; (e) determining the polarization of the electromagnetic wave after it traverses the system of electromagnetic retarders; (f) calculating the positions of the electromagnetic retarders to match the determined polarization of the electromagnetic wave with the polarization of the generated electromagnetic wave; and (g) compensating the effect of the physical medium on the polarization of the electromagnetic wave by setting the electromagnetic retarders according to the calculated positions.

21 Claims, 3 Drawing Sheets

(56) References Cited

U.S. PATENT DOCUMENTS

| | | | | |
|---|---|---|---|---|
| 2007/0223078 A1* | 9/2007 | Yao | ............... | G02B 27/28 |
| | | | | 359/259 |
| 2010/0239245 A1* | 9/2010 | Yao | ............... | G01J 4/00 |
| | | | | 356/365 |
| 2010/0315640 A1* | 12/2010 | Webb | ............... | H04B 10/2569 |
| | | | | 356/364 |
| 2013/0077151 A1* | 3/2013 | Yao | ............... | G02F 1/0136 |
| | | | | 359/290 |
| 2013/0083925 A1* | 4/2013 | Nordholt | ............... | H04L 9/0858 |
| | | | | 380/256 |

FOREIGN PATENT DOCUMENTS

| | | | | |
|---|---|---|---|---|
| WO | 2013048671 | | 4/2013 | |
| WO | WO-2023227663 A1 * | 11/2023 | ............ | G01N 21/21 |

OTHER PUBLICATIONS

Extended Search Report for EP22191368.4, dated Feb. 13, 2023 (9 pages).

Wang et al., "Realization of Arbitrary Inverse Unitary Transformation of Single Mode Fibre by Using Three Wave Plates", Chin. Phys. Lett. vol. 24 No. 9 (2007) 2471(5 pages).

Wang et al., "Experimental validation of dynamic polarization compensation in ground-satellite quantum key distribution", Sci. China Phys. Mech. Astron. vol. 57 No. 7 (2014) 1233-1237(5 pages).

Gramatikov Boris et al., "A method of calculating compensators in polarization-sensitive optical systems", Optik, Wissenschaftliche Verlag GMBH, DE, vol. 201, Sep. 30, 2019(8 pages).

\* cited by examiner

METHOD FOR POLARIZATION COMPENSATION AND FREE-SPACE OPTICAL COMMUNICATION SYSTEM FOR AIRCRAFT

RELATED APPLICATION

This application incorporates by reference and claims priority to European Patent application EP 22191368.4, filed Aug. 22, 2022.

TECHNICAL FIELD

The invention relates to a method for polarization compensation, particularly for receivers and/or transmitters in free-space optical communication systems. Moreover, the invention relates to receivers and/or transmitters in free-space optical communication systems, particularly for use on board of an aircraft and/or for communication in aviation.

BACKGROUND

Free space optical communications is a technological field with a vast array of applications. With the development of quantum communications, its scope is even broader.

One of the main challenges in optical communications is how to make sure that a signal emitted by a sender is correctly interpreted by a receiver after it is transmitted through a communication channel, which can modify its characteristics. A physical medium such air, glass or optical fibre, when used as a communication channel, can in particular modify the polarization of the electromagnetic waves that comprise the emitted signal.

Methods to identify light polarization distortions by a physical medium when used as an optical communication channel and methods to subsequently compensate for the polarization distortion exist. One state-of-the-art procedure is to perform a set of measurements with three wave plates in known positions, for example by positioning a polarizer and a photo-detector after the three wave plates and measuring the transmitted intensity. With the results of the measurements the polarisation states are calculated. Based on the nominal properties of the wave plates, they can be rotated such that an arbitrary correction to the polarization can be performed, thus compensating for the effects of the physical medium on the polarization of the waves. A procedure in this direction is explained in the scientific publications Chin. Phys. Lett. Vol. 24 No. 9 (2007) 2471 and Sci. China Phys. Mech. Astron. Vol. 57 No. 7 (2014) 1233-1237.

Most state-of-the-art procedures for polarization measurement and compensation rely in an essential way on the nominal properties of the wave plates, which in general depend on the temperature. On the other hand, quantum communications normally require the use of at least two wave signals with different frequency and very different intensity, while most of the state-of-the-art methods are meant to process one wave signal.

SUMMARY

The invention may be embodied to find improved solutions for an efficient compensation of the polarisation distortion that an electromagnetic wave undergoes when traversing a physical medium.

According to a first aspect of the invention, a method for polarization compensation is provided, comprising the following steps: (a) generating at least one beam of an electromagnetic wave; (b) sending the at least one beam through a physical medium; (c) receiving the at least one beam of an electromagnetic wave after it has traversed the physical medium; (d) measuring the intensity of the electromagnetic wave after it traverses a system of electromagnetic retarders; (e) determining the polarization of the electromagnetic wave after it traverses the system of electromagnetic retarders; (f) calculating the positions of the electromagnetic retarders to match the determined polarization of the electromagnetic wave with the polarization of the generated electromagnetic wave; and (g) compensating the effect of the physical medium on the polarization of the electromagnetic wave by setting the electromagnetic retarders according to the calculated positions.

A physical medium is to be understood as an optical channel consisting of e.g. air, glass, optical fibre or any combination thereof. In a realistic situation, a physical medium could comprise different sections of optical fibre, free space and optical lenses.

Electromagnetic retarders within the meaning of the present disclosure are optical elements made of birefringent materials that modify the polarization state of an electromagnetic wave without attenuating, deviating, or displacing the beam. Depending on the modification that they can produce, electromagnetic retarders come in different types, such as for example waveplates, birefringent optical fibers, liquid crystal modulators or fiber-based compensators. One of the most common type of electromagnetic retarders used in photonics are half-wave plates and quarter-wave plates.

The positions of the electromagnetic retarders refer here and in the following to the possible rotations of a number of electromagnetic retarders that are arranged in series, parallel to each other and aligned along an axis which is parallel to the direction of propagation of the received electromagnetic waves. The common axis of the electromagnetic retarders is also the axis of rotation.

According to a second aspect of the invention, a communication system is provided, comprising: a receiver device, configured to receive at least one beam of an electromagnetic wave from a physical medium; an analysis module, configured to determine the polarization of the received electromagnetic wave; and a polarization compensation module, which is configured to modify the polarization of the received electromagnetic wave. The polarization compensation module includes at least three electromagnetic retarders.

Although here, in the foregoing and also in the following, some functions are described as being performed by modules, it shall be understood that this does not necessarily mean that such modules are provided as entities separate from one another. In cases where one or more modules are provided as software, the modules may be implemented by program code sections or program code snippets, which may be distinct from one another but which may also be interwoven or integrated into one another.

Similarly, in cases where one or more modules are provided as hardware, the functions of one or more modules may be provided by one and the same hardware component, or the functions of several modules may be distributed over several hardware components, which need not necessarily correspond to the modules. Thus, any apparatus, system, method and so on which exhibits all of the features and functions ascribed to a specific module shall be understood to comprise, or implement, said module. In particular, it is a possibility that all modules are implemented by program code executed by the computing device, for example a server or a cloud computing platform.

According to a third aspect of the invention, an aircraft, in particular a passenger aircraft, comprises a communication system according to the second aspect of the invention.

With the solutions according to the invention, the distortion on the polarization of electromagnetic waves after being sent through a physical medium can be first determined and subsequently corrected (or compensated for), in a way that the original polarization of the electromagnetic waves, i.e. the polarization of the electromagnetic waves when emitted, is recovered.

A particular advantage of the solutions according to the invention is that the determination of the polarization distortion is rather generic, i.e. it does not rely on specific configurations of electromagnetic retarders, nor on the type of electromagnetic retarders used, nor on the quality of the electromagnetic retarders.

Another advantage of the solutions according to the invention is that it can compensate for the polarization distortion of weak optical beams such as single photon optical beams, which cannot be measured with a conventional polarimeter. This is particularly advantageous for applications related to quantum communications and in particular for those involving a quantum key distribution.

A further advantage of the solutions according to the invention is that it is versatile and e.g. enables to process electromagnetic waves of different wavelengths.

Advantageous configurations and refinements will become understood from the further dependent claims and from the description with reference to the figures.

According to some embodiments of the first aspect of the invention, the optical properties of the system of electromagnetic retarders are parametrized with Mueller matrices. Mueller matrices are mathematical representations that describe completely the linear optical properties of wave plates and can therefore be used to characterize the effect of the wave plates on electromagnetic waves.

According to some further embodiments of the first aspect of the invention, the Mueller matrices of the system of electromagnetic retarders are determined for different temperature ranges and for different wavelengths. The linear optical properties of the wave plates are a function of the temperature and also depend on the wavelength of the electromagnetic wave. A full characterization of the wave plates can be achieved if Mueller matrices as a function of these two parameters are determined. The electromagnetic retarders may comprise any combination of waveplates, birefringent optical fibers, liquid crystal modulators and/or fiber-based compensators.

According to some further embodiments of the first aspect of the invention, a reference beam and a second beam, with different amplitudes and frequencies, are generated. One of the particular advantages of the invention is that the polarization distortion can be corrected for electromagnetic waves with very different amplitudes and frequencies. In certain applications, being able to manage two different electromagnetic waves in real-time is desirable.

According to some further embodiments of the first aspect of the invention, the reference beam is a classical optical communication beam or an optical beacon beam and the second beam is a single photon optical beam. This is particularly advantageous in applications related to quantum communications, where quantum beams, i.e. those with a small number of photons, are accompanied by classical beams. The quantum beam carries quantum information, e.g. between two parties that share a cryptographic key, while the classical beam is used for authentication.

According to some further embodiments of the first aspect of the invention, the polarization of the reference beam is measured and the polarization of the second beam is compensated for. If the second beam is a quantum beam, a conventional polarimeter cannot be used to measure its polarization. In this case, the polarization distortion can be determined from the reference beam and this information then used to infer the polarization distortion of the second beam and correct it.

According to some further embodiments of the first aspect of the invention, the polarization of the reference beam is measured right after it travels through a single electromagnetic retarder, preferably an achromatic half-wave plate. In these embodiments only the rotation of the reference beam can be determined, which allows for a fast real-time compensation of frame rotation.

According to some further embodiments of the first aspect of the invention, the reference beam and the second beam have a frequency difference above 100 nm. Chromatic electromagnetic retarders such as waveplates can be used for electromagnetic waves of different frequencies, as long as the spectral range is around 100 nm. However, in several applications, among which those related to quantum communications, the spectral distance between the electromagnetic waves is larger than 100 nm.

According to some further embodiments of the first aspect of the invention, the polarization of the electromagnetic wave is parametrized with a Stokes vector. Among the different ways that the polarization state of an electromagnetic wave can be described, the Stokes vector (or Stokes parameters) have the advantage that they are related to measurable quantities and can be determined by measuring the intensity of the electromagnetic wave in different angular directions.

According to some embodiments of the second aspect of the invention, the polarization compensation module comprises an arbitrary number, in particular a number of three or more, electromagnetic retarders, each of an arbitrary type. It is a fundamental aspect of the invention that the system of electromagnetic retarders used to measure the polarization and compensate for its distortion is not restricted to a certain configuration but can contain any number of e.g. half-wave plates and quarter-wave plates or of other electromagnetic retarders with other fractions of wavelength in an arbitrary number of three or more electromagnetic retarders.

According to some embodiments of the second aspect of the invention, the polarization compensation module comprises a number of half-wave plates and no quarter-wave plates. In certain polarization devices, a quarter-wave plate, a half-wave plate and a quarter-wave plate are arranged in series. The principles of the present invention are not restricted to this configuration and the system of wave plates have a broader range of possible configurations.

According to some embodiments of the second aspect of the invention, the system of wave plates consists of achromatic electromagnetic retarders. Achromatic and super-achromatic electromagnetic retarders can deal with electromagnetic waves of different frequencies. In some embodiments, in particular those where a reference beam and a second beam are present, the presence of achromatic electromagnetic retarders in the system of electromagnetic retarders is useful to be able to analyse both beams.

According to some embodiments of the second aspect of the invention, the analysis module further comprises a polarimeter or, alternatively, a photodiode and a polarizer.

The above configurations and refinements may be combined with one another as desired where expedient. Further possible embodiments, refinements and implementations of the invention also encompass combinations, which are not explicitly mentioned, of features of the invention described above or below with regard to the exemplary embodiments. In particular, a person skilled in the art will also add individual aspects as improvements or additions to the respective basic form of the present invention.

SUMMARY OF THE DRAWINGS

The present invention will be discussed in more detail below on the basis of the exemplary embodiments shown in the schematic figures. In the figures.

The appended figures are intended to provide improved understanding of the embodiments of the invention. They illustrate embodiments and serve, in conjunction with the description, for the explanation of principles and concepts of the invention. Other embodiments, and many of the stated advantages, will emerge with regard to the drawings. The elements of the drawings are not necessarily shown true to scale relative to one another. Direction-indicating terminology such as, for instance, "top", "bottom", "left", "right", "above", "below", "horizontal", "vertical", "front", "rear" and similar indications are used only for explanatory purposes and do not serve to restrict the generality to specific configurations as shown in the figures.

In the figures of the drawing, elements, features and components which are identical, functionally identical and of identical action are denoted in each case by the same reference designations unless stated otherwise.

DESCRIPTION OF EXEMPLARY EMBODIMENTS

The detailed description includes specific details for the purpose of providing a thorough understanding of the present invention. However, it will be apparent to those skilled in the art that the present invention may be practised without these specific details.

Figure 1:
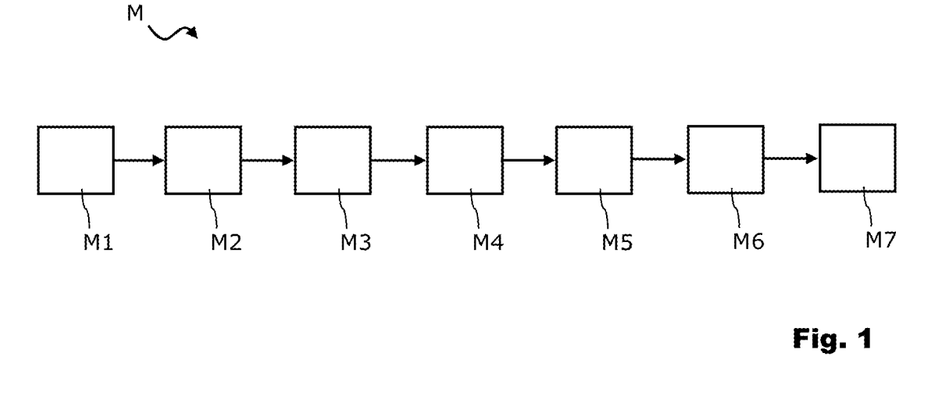
FIG. 1 shows a flowchart of a method for polarization compensation according to one embodiment of the invention.

FIG. 1 shows a flowchart of a method M for polarization compensation according to one embodiment of the invention. In one step M1, an electromagnetic wave with a certain polarization is generated by a sender, and in a further step M2 it is sent through a physical medium, which can comprise e.g. air, glass, fibre or a combination thereof. The electromagnetic wave is received in a step M3 after it has travelled through the physical medium. While going through the medium, the polarization with which the electromagnetic wave was emitted gets distorted and changes. In a further step M4, the intensity of the received electromagnetic wave is measured after it passes through a system of electromagnetic retarders. Once the intensity of the wave is measured, in a step M5 the polarization of the received electromagnetic wave is determined. In some of the embodiments, the polarization of the wave is characterized with a Stokes vector, whose parameters can be extracted from measurements of the intensity. In a further step M6, a position of the electromagnetic retarders is calculated, in order that the effect of the electromagnetic retarders compensates the distortion on the polarization of the electromagnetic wave caused by the physical medium. This is possible if the electromagnetic retarders are characterized e.g. with their associated Mueller matrices, such that their optical properties are known. The calculation therefore indicates how the electromagnetic retarders should be rotated, such that they revert the polarization distortion that the electromagnetic wave suffered while traveling through the physical medium. In another step M7, a polarization compensation is performed and the electromagnetic retarders are rotated according to the calculation. In this new configuration of the electromagnetic retarders, the polarization state of the emitted electromagnetic wave is recovered. The electromagnetic retarders may include waveplates, birefringent optical fibers, liquid crystal modulators and/or fiber-based compensators in various combinations.

Figure 2:
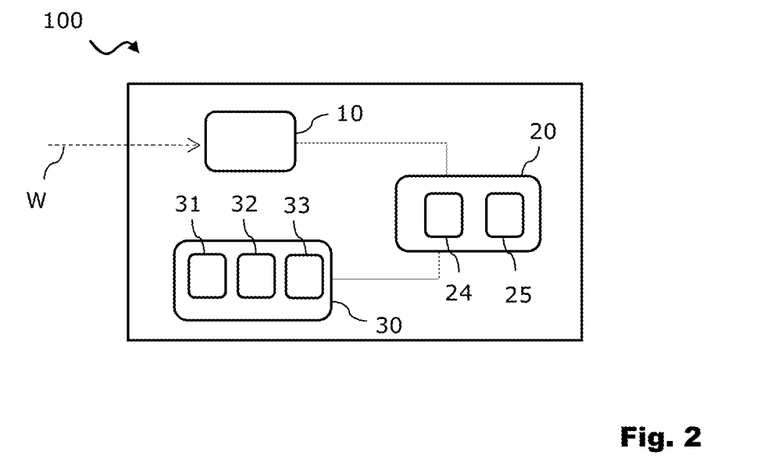
FIG. 2 shows a schematic block diagram of a communication system according to one embodiment of the invention.

FIG. 2 shows a schematic block diagram of a communication system 100 according to one embodiment of the invention. The communication system 100 comprises a receiver device 10, an analysis module 20 and a polarization compensation module 30.

The receiver device 10 is to be understood broadly as any entity able to receive an electromagnetic wave W coming from a physical medium. A receiver device 10 could be simply a lens, an antenna or a more sophisticated system to acquire electromagnetic signals.

The analysis module 20 is configured to determine the polarization of electromagnetic wave W. In FIG. 2, the analysis module 20 comprises a polarization analyser unit 24 and an optical transceiver unit 25. In some embodiments of the invention, the polarization analyser unit 24 may consist of a polarizer and a photodiode, while in some other embodiments it may consist of a polarimeter. The optical transceiver unit 25 is configured to determine the polarization of the electromagnetic wave W digitally.

The polarization compensation module 30 is configured to modify the polarization of the electromagnetic wave W. In FIG. 2, the polarization compensation module 30 comprises a system of electromagnetic retarders 31, a computing unit 32 and a motor 33.

The system of electromagnetic retarders 31 comprises an arbitrary number of electromagnetic retarders of arbitrary type, for example half-wave plates and quarter-wave plates, birefringent optical fibers, liquid crystal modulators and/or fiber-based compensators, chromatic but possibly achromatic and/or super-achromatic. These electromagnetic retarders are arranged sequentially and are aligned parallel to each other with a common axis, which is parallel to the propagation direction of the electromagnetic wave W received by the receiver device 10. The electromagnetic retarders can be rotated around the common axis independently.

The computing unit 32 is configured to operate with mathematical representations for the polarization of an electromagnetic wave W and for the optical properties of electromagnetic retarders. The computing unit 32 may process measurements of the polarization of an electromagnetic wave W and convert them into Stokes vectors. It may also characterize the linear optical properties of the electromagnetic retarders in terms of Mueller matrices.

The computing unit 32 comprises, at least, a central processing unit, CPU, and/or at least one graphics processing unit, GPU, and/or at least one field-programmable gate array, FPGA, and/or at least one application-specific integrated circuit, ASIC and/or any combination of the foregoing. Each of them may further comprise a working memory operatively connected to the at least one CPU and/or a non-transitory memory operatively connected to the at least one CPU and/or the working memory. Each of them may be implemented partially and/or completely in a local apparatus and/or partially and/or completely in a remote system such as by a cloud computing platform.

The computing unit 32 may also comprise executable programs as software or applications, in particular an optimization algorithm, and/or a database. The database may store, at least, information about the Mueller matrices for the different electromagnetic retarders, for different temperatures and for different electromagnetic wave frequencies. The optimization algorithm is configured to calculate, based on the Mueller matrices stored in the database and the Stokes vector associated with the received electromagnetic wave W, new positions for the electromagnetic retarders in order to compensate for the polarization distortion caused by the physical medium. These new positions for the electromagnetic retarders may be released with a compensation signal.

The motor 33 is configured to receive compensation signals and mechanically adjust the rotation of the system of electromagnetic retarders accordingly, such that the compensation correction is performed. The motor 33 can be any mechanical device, preferably an electric motor. It is connected to the system of electromagnetic retarders 31 in a way that each electromagnetic retarder can be rotated individually.

Figure 3:
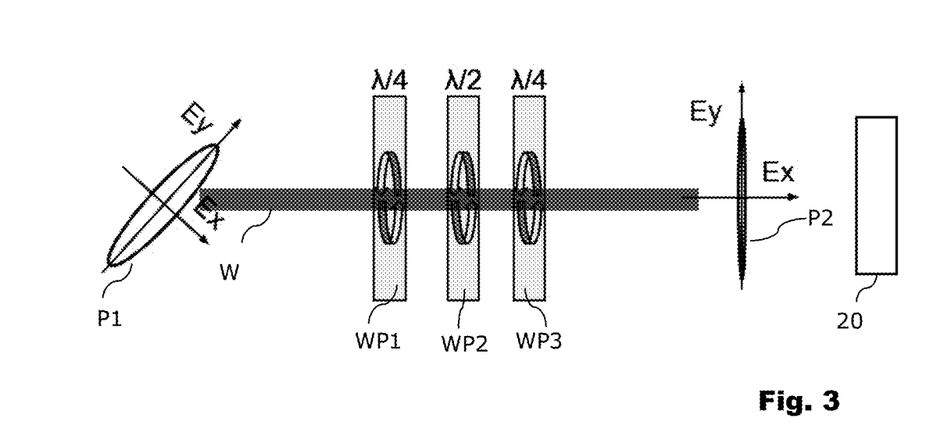
FIG. 3 shows a schematic illustration of the polarization compensation for a single electromagnetic wave according to one embodiment of the invention.

FIG. 3 shows a schematic illustration of the polarization compensation for a single electromagnetic wave W according to one embodiment of the invention. FIG. 3 shows an electromagnetic wave W, a number of electromagnetic retarders and an analysis module 20.

For illustration purposes, the system of electromagnetic retarders consists of a quarter-wave plate WP1, a half-wave plate WP2 and a half-wave plate WP3 sequentially ordered and parallel to each other, which can be rotated along their common axis, which is aligned with the propagation direction of the electromagnetic wave W, generated and emitted by a sender (not shown in the figure) with a defined polarization state P1. In FIG. 3, the polarization state is represented by an ellipse with axes Ex and Ey.

The linear optical properties of the wave plates WP1, WP2, WP3 are determined and represented as Mueller matrices, a mathematical representation which offers a complete description of how a wave plate acts when polarised light goes through it. The characterization can be optionally done for several wavelengths and different temperatures, such that the setup has the versatility to be applied to different wave frequencies and in different environmental conditions. The characterization information contained in the Mueller matrices can be stored in a database, which can be physically inside the computing unit 31 or in a cloud storage, from where it can be retrieved.

With the wave plates WP1, WP2, WP3 characterized with Mueller matrices, the positions (i.e. the rotations) of the wave plates can be optimised in order to measure the polarization state P2 and encode this information in the form of a Stokes vector. The analysis module 20 is configured to perform this measurement, which relies on the characterization of the optical properties of the wave plates, not on their nominal behaviour. In this way, the arrangement of wave plates WP1, WP2, WP3 shown in FIG. 3 can be used for a precise measurement of the polarization P2 instead of a traditional arrangement of a quarter-wave plate and a polarizer, which relies heavily on the quality standards of the quarter-wave plate and the polarizer and is, for this reason, more expensive.

Once the polarization P2 has been measured and the effect of the wave plates WP1, WP2, WP3 is known, the effect of the physical medium on the polarization P1 can be inferred. New wave plate positions are calculated, e.g. with an optimization algorithm, such that when an electromagnetic wave W is emitted with polarization P1, the polarization P2 that one determines after the electromagnetic wave W travels through the physical medium and through the wave plates WP1, WP2, WP3 is the original polarization P1.

As an example, consider a sender that wants to emit sequentially four linearly polarized states and two circularly polarized states, namely a horizontally polarized state H, a vertically polarized state V, a polarized wave with +45 degrees with respect to the horizontal D1, a polarized wave with −45 degrees with respect to the horizontal D2, a clockwise circular state R and an anticlockwise circular state L. The polarizations of the corresponding emitted waves have Stokes vectors S0(H), S0(V), S0(D1), S0(D2), S0(R) and S0(L). These polarized beams are sent through a physical medium, which causes their polarization states to change. If they were measured right before being received, these states would be characterized with Stokes vectors S1(H), S1(V), S1(D1), S1(D2), S1(R) and S1(L). The optimized position of the wave plates WP1, WP2, WP3, which takes into account the frequency of the waves and the temperature conditions of the physical medium, is configured such that after passing through them, all the electromagnetic waves get back to their initial polarization state, i.e. their polarization is described by S0(H), S0(V), S0(D1), S0(D2), S0(R) and S0(L).

Figure 4:
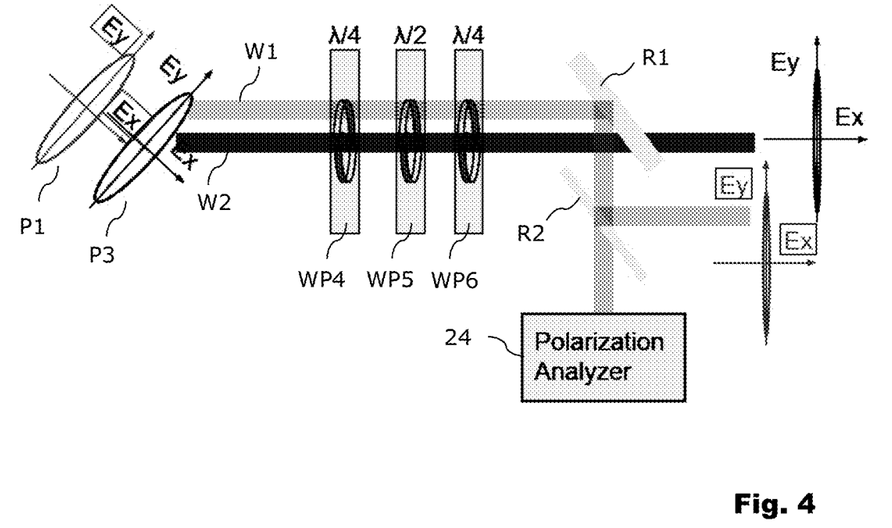
FIG. 4 shows a schematic illustration of the polarization compensation for a configuration with two electromagnetic waves according to another embodiment of the invention.

FIG. 4 shows a schematic illustration of the polarization compensation for a configuration that can process two electromagnetic waves W1, W2 according to another embodiment of the invention. Configurations which can process two electromagnetic waves W1, W2 will be also referred to as dual wavelength configurations.

FIG. 4 shows a first electromagnetic wave W1 and a second electromagnetic wave W2, with respective polarizations P1 and P3, which are generated and emitted by a sender (not shown in the figure). In the figure, the polarization states are represented by ellipses with axes denoted by Ex and Ey for the second electromagnetic wave W2 and with axes denote by (boxed) Ex and Ey for the first electromagnetic wave W1.

In some embodiments, particularly those related to quantum communications, the information to be send through an optical channel is shared by two electromagnetic waves W1, W2. The first electromagnetic wave W1 comprises a classical optical beam or a beacon beam, which is used to authenticate the channel, while the second electromagnetic wave W2 comprises encoded information, which could comprise a quantum key distribution.

The electromagnetic waves W1, W2 are sent through a physical medium and received by a user, after which they go through a number of wave plates WP4, WP5, WP6. This system of wave plates 31 consists, as in FIG. 3, of a quarter-wave plate WP4, a half-wave plate WP5 and a half-wave plate WP6 sequentially ordered and parallel to each other, which can be rotated along their common axis, which is aligned with the propagation direction of the electromagnetic waves W1, W2. As in FIG. 3, this particular configuration is chosen for illustrative purposes but the scope of the invention applies to generic configurations. However, in contrast to FIG. 3, the wave plates WP4, WP5, WP6 are achromatic or super achromatic, such that they can be used for two electromagnetic waves W1, W2 with different frequencies.

As mentioned above, if the second electromagnetic wave W2 is a quantum wave, i.e. it is a weak wave consisting of few photons or even a single photon optical wave, its polarization cannot be detected with a conventional polarizer without hampering the wave. FIG. 4 shows, according to some embodiments of the invention, that in this case the first electromagnetic wave W1, which is a classical optical wave, can be measured, e.g. by a polarization analyser 24. FIG. 4 shows schematically how the measurement of the polarization of the first electromagnetic wave W1 could be done without disturbing the second electromagnetic wave W2. The trajectory of the first electromagnetic wave W1 is modified with a reflective prism R1 and then partially reflected (and partially refracted) by a prism R2. The partially refracted part of the first electromagnetic wave W1 is used to measure the polarization of the first electromagnetic wave W1. With this information, the wave plates WP4, WP5, WP6 can be rotated such that the polarization distortion caused by the medium is compensated for with respect to both electromagnetic waves W1, W2. The original polarization P3 of the second electromagnetic wave W2 can therefore be recovered without hampering the electromagnetic wave W2.

The polarization analysis of the first electromagnetic wave W1 can be done using a separate setup, e.g. by using a polarimeter, in which case the quantum operation during the correction process can proceed unaltered. Alternatively, a polarization analysis according to the method described in FIG. 3 can be followed. This has the advantage that the analysis can be done with a polarizer and a photodiode, which is more cost efficient. The disadvantage is that the quantum communication has to be interrupted during the polarization analysis.

In order to further optimize the performance of the wave plates WP4, WP5, WP6, they can be characterized beforehand by determining the corresponding Mueller matrices for the frequencies of the electromagnetic waves W1, W2.

Figure 5:
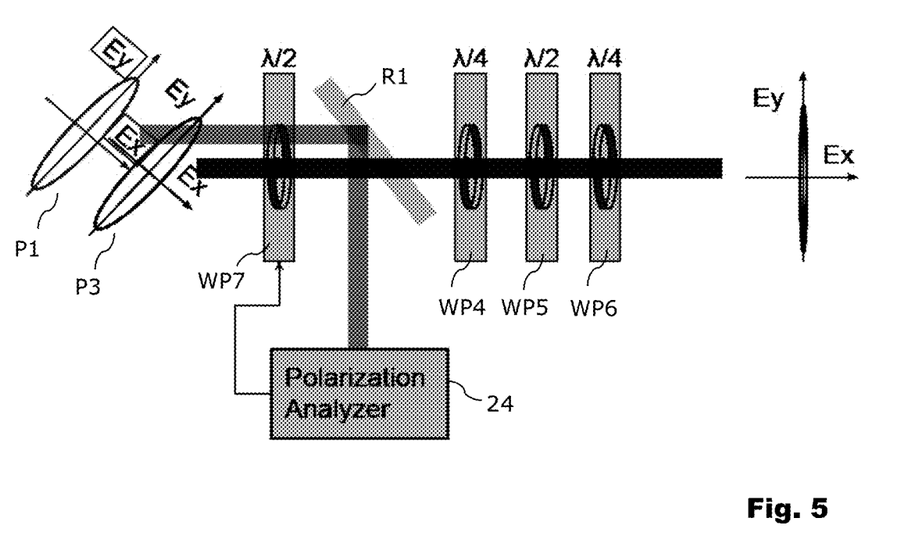
FIG. 5 shows a schematic illustration of the polarization compensation for a configuration with two electromagnetic waves according to a further embodiment of the invention.

FIG. 5 shows a schematic illustration of the polarization compensation for another dual wavelength configuration with two electromagnetic waves W1 and W2, according to a further embodiment of the invention.

FIG. 5 shows a first electromagnetic wave W1 and a second electromagnetic wave W2, with respective polarizations P1 and P3, which are generated and emitted by a sender (not shown in the figure). As in FIG. 4, the polarization states are represented by ellipses with axes denoted by Ex and Ey for the second electromagnetic wave W2 and with axes denote by (boxed) Ex and Ey for the first electromagnetic wave W1.

The embodiment described in FIG. 5 shows the wave plates of FIG. 4, consisting of a sequence of a quarter-wave plate WP4, a half-wave plate WP5 and a half-wave plate WP6. In the setup of FIG. 5, these wave plates WP4, WP5, WP6 do not need to be achromatic or super achromatic plates. Additionally, a half-wave plate WP7 is present, which is placed such that it is the first wave plate that the electromagnetic waves W1, W2 will go through after being received. The half-wave plate WP7 is preferably an achromatic or super achromatic wave plate if the difference in frequency between the electromagnetic waves W1, W2 is above the 100 nm.

In the embodiment shown in FIG. 5, the polarization of the first electromagnetic wave W1 is measured right after it goes through the half-wave plate WP7. A reflective prism R1 directs the first electromagnetic wave W1 towards a polarization analyser 24, which is configured to perform the polarization analysis.

Since the first electromagnetic wave W1 only passes the half-wave plate WP7, only the polarization distortion caused by a rotation can be detected. This allows for a fast real-time compensation of the frame of reference, through a rotation of the wave plate WP7. In this case, the operation of the optimization algorithm may be limited simply to maximize the intensity of the wave.

The embodiment of FIG. 5 allows for the compensation of the rotation of e.g. an aircraft or a satellite, but does not allow for a real-time compensation of a generic elliptical polarization distortion. A generic compensation can be performed with the setup of FIG. 3 or the setup of FIG. 4.

Figure 6:
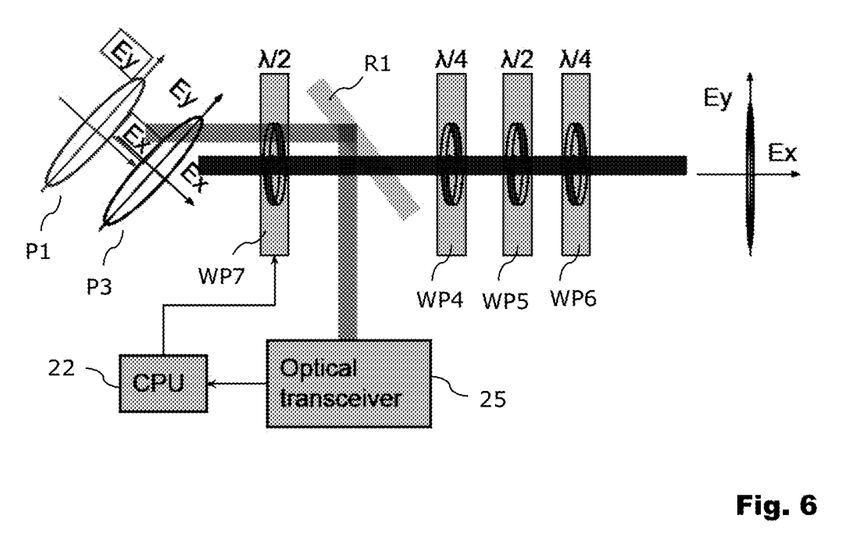
FIG. 6 shows a schematic illustration of the polarization compensation for a configuration with two electromagnetic waves according to yet another embodiment of the invention.

FIG. 6 shows a schematic illustration of the polarization compensation for yet another configuration with two electromagnetic waves W1, W2 according to some embodiments of the invention. FIG. 6 is a variant of FIG. 5, according to which both the polarization analysis and the compensation take place digitally.

FIG. 6 shows a first electromagnetic wave W1 and a second electromagnetic wave W2, with respective polarizations P1 and P3, which are generated and emitted by a sender (not shown in the figure). As in FIG. 4 and FIG. 5, the polarization states are represented by ellipses with axes denoted by Ex and Ey for the second electromagnetic wave W2 and with axes denote by (boxed) Ex and Ey for the first electromagnetic wave W1.

The embodiment described in FIG. 6 shows the wave plates of FIG. 5, namely a sequence of a half-wave plate WP7, a quarter-wave plate WP4, a half-wave plate WP5 and a half-wave plate WP6. Only the half-wave plate WP7 may be achromatic or super achromatic, in case the two electromagnetic waves W1, W2 have frequencies which are separated by more than 100 nm.

The first electromagnetic wave W1, after going through the half-wave plate WP7, is reflected by a prism R1 and directed towards an optical transceiver 25, which is configured to receive the first electromagnetic wave W1 and generate an information about the rotation of its polarization P1. This information is transmitted to a CPU unit 22, which could be part of the computing unit 31 of the polarization compensation module 30 of FIG. 2. The CPU unit 22 sends a signal to the motor 33 shown in FIG. 2, which is configured to adjust the half-wave plate WP7 such that the polarization rotation caused by the physical medium is compensated for.

Figure 7:
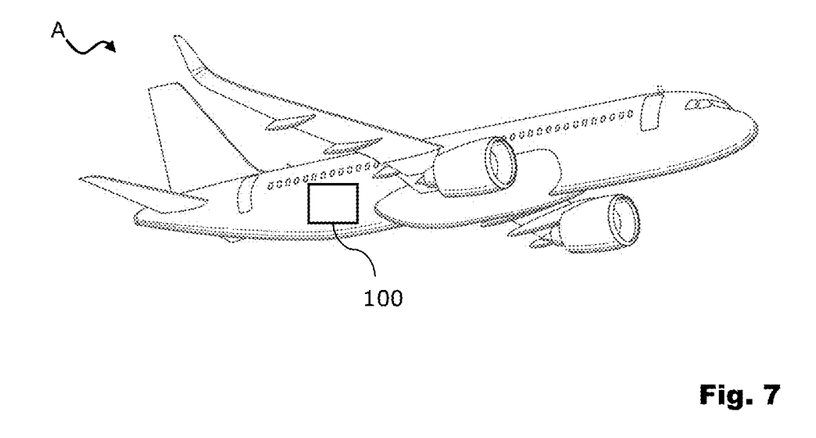
FIG. 7 shows an aircraft having a communication system according to a further embodiment of the invention.

FIG. 7 shows an aircraft A having a communication system 100 according to an embodiment of the present invention. The aircraft A can in particular be a passenger aircraft. The electromagnetic waves W1, W2 (not shown in the figure) can be emitted e.g. by a communication satellite or a communication base station on the ground, such as at an airport. The physical medium comprises in this case at least the free space and part of the atmosphere that separates the communication satellite or base station from the aircraft A. With the communication system 100, the polarization distortion on the electromagnetic waves W1, W2 caused by the physical medium can be compensated for and the information of the original electromagnetic waves W1, W2 retrieved.

In order to improve the stringency of the representation, various features were combined in one or more examples in the detailed description above. However, it should be clear in this case that the description above is only of an illustrative and in no way restrictive nature. It is used to cover all alternatives, modifications and equivalents of the various features and exemplary embodiments. Many other examples will be immediately and directly clear to a person skilled in the art on the basis of his technical knowledge in view of the description above.

The exemplary embodiments were chosen and described in order to be able to represent the principles on which the invention is based and their possible uses in practice in the best possible manner. As a result, experts can optimally modify and use the invention and its various exemplary embodiments for the intended purpose. In the claims and the description, the terms "containing" and "having" are used as neutral concepts for the corresponding term "comprising". Furthermore, a use of the terms "a", "an" and "one" is not intended to fundamentally exclude a plurality of features and components described in such a way. Also, "or" means either or both unless clearly indicated otherwise.

The invention claimed is:

1. A method for polarization compensation comprising:
    generating a first electromagnetic wave and a second electromagnetic wave having amplitude and frequency different than the amplitude and the frequency of the first electromagnetic wave;
    sending the first electromagnetic wave and the second electromagnetic wave through a physical medium;
    receiving the first electromagnetic wave and the second electromagnetic wave after the first electromagnetic wave and the second electromagnetic wave traverse the physical medium;
    measuring an intensity of the first electromagnetic wave after the first electromagnetic wave is received and traverses at least one electromagnetic retarder of a system of electromagnetic retarders, wherein the system of electromagnetic readers includes an achromatic retarder or a super achromatic retarder;
    determining a polarization of the first electromagnetic wave after the first electromagnetic wave traverses the least one electromagnetic retarder of the system of electromagnetic retarders;
    calculating positions for electromagnetic retarders in the system of electromagnetic retarders to compensate for distortion to the polarization of the first electromagnetic wave due to the physical medium, wherein the calculation of the positions is based on the determined polarization of the first electromagnetic wave and a first polarization of the first electromagnetic wave, wherein the first polarization is a polarization of the first electromagnetic wave before the sending of the first electromagnetic wave through the physical medium; and
    compensating for polarization distortion due to the physical medium on the polarization of the second electromagnetic wave by setting the electromagnetic retarders in the system according to the calculated positions.

2. The method according to claim 1, wherein optical properties of the system of electromagnetic retarders are parametrized with Mueller matrices.

3. The method according to claim 2, wherein the Mueller matrices of the system of electromagnetic retarders are determined for different temperature ranges of the physical medium and for different wavelengths of at least one of the first electromagnetic wave or the second electromagnetic wave.

4. The method according to claim 1, wherein the first electromagnetic wave represents a reference beam and a the second electromagnetic wave represents a single photon optical beam.

5. The method according to claim 4, wherein the reference beam is an optical communication beam.

6. The method according to claim 4, wherein the polarization of the reference beam is measured, and the polarization of the second electromagnetic wave is compensated for.

7. The method according to claim 6, wherein the polarization of the first electromatic wave is measured after the first electromagnetic wave traverses through one of the electromagnetic retarders of the system of the electromagnetic retarders and before the first electromagnetic wave traverses any other of the electromagnetic retarders in the system of electromagnetic retarders.

8. The method according to claim 1, wherein the first electromagnetic wave and the second electromagnetic differ in frequency by more than 100 nm.

9. The method according to claim 1, wherein the polarization of the first electromagnetic wave is parametrized with a Stokes vector.

10. The method of claim 1, wherein the physical medium is free space and includes the atmosphere.

11. A communication system comprising:
    a receiver device configured to receive a first electromagnetic wave and a second electromagnetic wave having amplitude and frequency different than the amplitude and the frequency of the first electromagnetic wave, wherein the first electromagnetic wave and the second electromagnetic wave pass through a physical medium before reaching the receiver device;
    an analysis module, configured to determine a polarization of the first electromagnetic wave received by the receiver device; and
    a polarization compensation module configured to compensate for polarization distortion caused by the physical medium to the received first electromagnetic wave, wherein the polarization compensation module includes a system of at least three electromagnetic retarders,
    wherein the at least three electromagnetic retarders include an achromatic retarder or a super achromatic retarder,
    wherein the polarization distortion is determined by the communication system using the polarization of the first electromagnetic wave, and
    wherein the polarization compensation module is configured to set the at least three electromagnetic retarders to compensate for the polarization distortion.

12. The communication system according to claim 11, wherein the polarization compensation module comprises half-wave plates and is devoid of quarter-wave plates.

13. The communication system according to claim 11, wherein the analysis module further comprises at a polarimeter or a combination of a photodiode and a polarizer.

14. An aircraft comprising the communication system according to claim 11.

15. The communication system of claim 11, wherein the physical medium is free space and includes the atmosphere.

16. A method for polarization compensation comprising:
    generating a first electromagnetic wave and a second electromagnetic wave having amplitude and frequency different than the amplitude and the frequency of the first electromagnetic wave;

passing the first electromagnetic wave and the second electromagnetic wave through a physical medium;

receiving the first electromagnetic wave and the second electromagnetic wave after the first electromagnetic wave and the second electromagnetic wave pass through the physical medium;

sending the received first electromagnetic wave through at least one electromagnetic retarder of a system of electromagnetic retarders after the receiving and the passing of the first electromagnetic wave through the physical medium, wherein the system of electromagnetic retarders includes an achromatic retarder or a super achromatic retarder, measuring an intensity of the first electromagnetic wave after the first electromagnetic wave passes through the at least one of the electromagnetic retarders in the system of electromagnetic retarders;

determining a polarization of the first electromagnetic wave after the first electromagnetic wave passes through the at least one of the electromagnetic retarders;

calculating positions of the electromagnetic retarders in the system of electromagnetic retarders based on the determined polarization of the first electromagnetic wave and on a polarization of the first electromagnetic wave before the sending step, wherein the calculated positions of the electromagnetic retarders are determined to compensate for distortion of the first electromagnetic wave by the physical medium; and adjusting the electromagnetic retarders in the system of electromagnetic retarders to conform to the calculated positions, and compensating a polarization of the second electromagnetic wave by passing the second electromagnetic wave through the electromagnetic retarders after the adjusting of the electromagnetic retarders.

17. The method of claim 16, wherein the calculating of the positions includes matching the determined polarization with a polarization of the first electromagnetic wave before the passing through the physical medium.

18. The method according to claim 16, wherein the first electromagnetic wave is a reference beam and the second electromagnetic beam is a single photo optical beam.

19. The method according to claim 16, wherein the first electromagnetic wave and the second electromagnetic wave differ in frequency by at least 100 nm.

20. The method according to claim 16, wherein the polarization of the first electromagnetic wave is parametrized with a Stokes vector.

21. The method of claim 16, wherein the physical medium is free space and includes the atmosphere.

* * * * *